INVENTOR.
SHOGO ISHIKAWA
BY
ATTORNEYS 3,214,664
REVERSIBLE POLYPHASE MOTOR WITH
PHASE PROTECTIVE DEVICE
Shogo Ishikawa, Kawasaki-shi, Kanagawa-ken, Japan, assignor to Kabushiki Kaisha Kito Seisakusho, Kanagawa-ken, Japan
Filed Aug. 15, 1961, Ser. No. 131,612
5 Claims. (Cl. 318—207)

The present invention relates to a hoisting plant having in combination a power source, an electrically-driven hoist, a three-phase induction motor for driving thereof, and a safety apparatus for said hoist including a control switch for controlling the rotational direction of said motor and limit switches for preventing the over-winding of said hoist.

The main object of the present invention is to obtain a hoisting plant of the above-mentioned type which can be operated without any serious damage such as might occur in a hoisting plant of a conventional type.

In order to attain this object, according to the present invention, a phase-rotation detector, connected with said power source to detect the phase-rotation thereof, and a selective switch interposed between said limit switches and said motor, are provided in such a manner that the selective switch cooperates with the phase-rotation detector so that the driving motor may rotate in conformity with the closing direction of the control switch, in any connection between the power source and said hoisting plant, to secure the correct functions of the limit switches.

Figure 1:
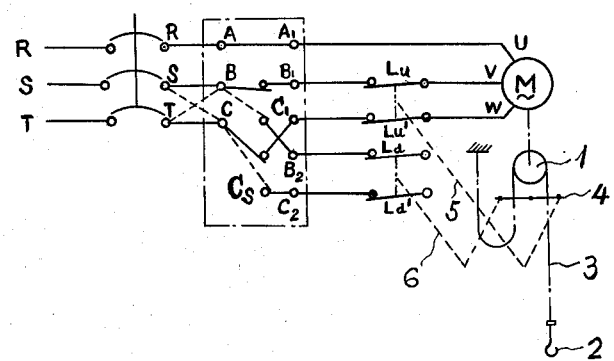
Figure 2:
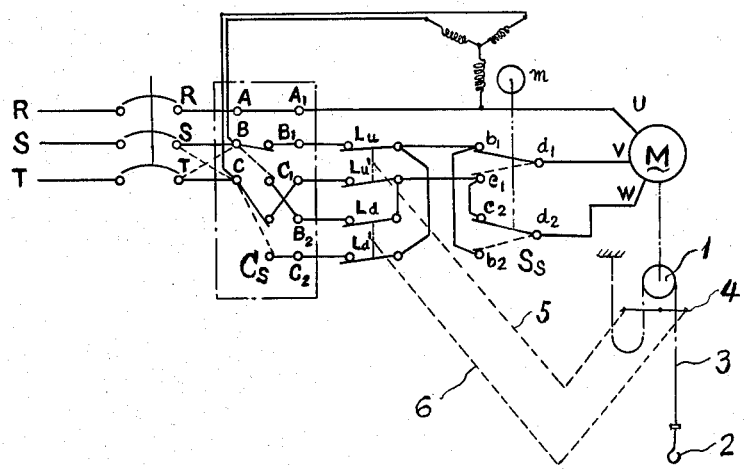

The accompanying drawing shows one embodiment of the hoisting plant in accordance with the present invention, wherein FIG. 1 is a wiring diagram for an example of the conventional hoisting plant;

FIG. 2 is a wiring diagram for the embodiment of the hoisting plant of the invention.

In the drawings, the corresponding parts shown in both FIG. 1 and FIG. 2 are indicated by the same reference number, respectively.

The three-phase induction motor M shown in FIG. 1 is provided with three lead wires, U, V and W which are connected, through a rotation direction controlling switch Cs, with a three-phase power source comprising lines R, S and T. Motor M can be rotated in reverse directions in accordance with the particular connections established by the switch Cs. Thus, if switch Cs is closed in a hook raising direction, and the connections R–U, S–V and T–W are established, motor M rotates in the forward or normal direction to cause the electrically driven hoist 1 to wind the chain in an upward direction. However, when the connections are R–U, S–W and T–V, motor M will rotate in the opposite or reverse direction to cause hoist 1 to wind the chain in a downward direction.

Hoist 1 is provided with two sets of limit switches. Upward movement of the hook is interrupted by opening of limit switches Lu and Lu', and lowering of hook 2 is limited by opening of limit switches Ld and Ld'. When hoist 1 is operated in a chain raising direction by the forward or normal rotation of motor M, hook 2 is raised toward the winding means of the hoist. Before the hook has reached the winding means, it will bear against a limit lever 4 which moves a connecting rod 5 to cause the limit switch Lu, Lu' to open, so that the electric circuit will be broken and the motor will stop rotating; the object being to prevent the hook 2 from being pulled into the winding means.

When switch Cs is operated to effect reverse direction of rotation of motor M, hoist 1 is operated in a lowering direction to unwind the chain in a hook lowering direction. In this case, a loop of chain 3, which is changeable in length with movement of hook 2, will engage limit lever 4 to move a connecting rod 6 to open limit switches Ld and Ld'. This interrupts the energization of motor M at the lower limit of movement of hook 2 so that the motor will stop rotating. By virtue of the provision of these safety features, chain 3 will be prevented from damage which might be caused by excessive force applied to it, and furthermore the body of hoist 1 will not be damaged.

In above cases, it is clear from the function of the electrically-driven hoist 1 that the motor M is required to be able to rotate to cause the hook 2 to move downwardly even after interruption of motor rotation resulting from the opening of the limit switches Lu, Lu', and also to rotate to cause the hook 2 to move upwardly even after interruption of motor rotation resulting from the opening of the limit switches Ld, Ld'. Therefore separate sets of limit switches must be provided for the upward and downward winding of the hoist 1, respectively.

However, if control switch Cs is connected with power lines R, S, T in such a manner as to establish the connections R–A, S–C and T–B, and if switch Cs is then operated in the manner normally to effect forward or normal rotation of motor M to move the hoist in the chain raising direction, motor M will be rotated reversely to move the hoist in the chain lowering direction. In such case, the loop of chain 3 will contact limit lever 4 which, through rod 6, will open limit switches Ld and Ld'. However, this will be of no effect to interrupt rotation of motor M, because limit switches Lu and Lu' remain closed to maintain energization of the motor. Consequently, the hoist 1 continues to operate in the chain lowering direction and may cause damage to the chain and to the body of the hoist.

Similarly, if the connections of the switch Cs to the power lines R, S, T are, as stated, R–A, S–C, and T–B, and switch Cs is operated to energize motor M in the chain lowering direction, motor M will be rotated in the normal or forward direction to raise hook 2. This will wind the chain upwardly until hook 2 contacts limit lever 4. Limit lever 4 then opens limit switches Lu and Lu', but motor M still remains energized through limit switches Ld and Ld' so that the chain continues to be raised, again resulting in the possibility of damage to the chain and to the body of the hoist.

In other words, there are some cases where the limit switches will not act properly due to the wrong connection between the power source and the control switch. The only way to make sure of the correctness of said connection is fundamentally dependent on a trial and error method. As a matter of fact, the hoist 1 is driven by the motor rotating in one or another direction, so that operators often neglect the precaution against a wrong connection, such as that above mentioned. Such a possibility will occur, especially when it is necessary to connect the power source R, S, T to a newly arranged control switch, such as might be necessary upon modification of a factory.

One embodiment of the hoisting plant of the invention has successfully removed above danger by providing a safety apparatus including a control switch, two sets of limit switches, a phase-rotation detector m driven by a small-size three-phase motor and connected with the power source to detect the phase-rotation thereof, and a selective switch interposed between a main motor M and said limit switches, said selector switch cooperating with said detector so that said main motor may rotate in the normal or reverse direction according to the normal or reverse closing-direction of said control switch, respectively, to secure the correct functions of said limit switches.

Now referring to FIG. 2, assume that connections between the power source R, S, T and the control switch Cs are R–A, S–B and T–C. Assume also that phase-rotation detector $m$ is detecting the clockwise rotation of the phase and two movable contacts $d_1$, $d_2$ of a selector switch $Ss$ are engaged with the fixed contacts $b_1$, $c_2$, respectively, while the control switch $Cs$ is closed in the normal direction. Then the connections R–A–$A_1$–U, S–B–$B_1$–$b_1$–$d_1$–V, T–C–$C_1$–$c_2$–$d_2$–W are obtained and the main motor M will rotate in the normal direction to cause the electrically-driven hoist 1 to wind the chain upwardly. Reaching the limit point of said winding, the hook 2 contacts limit lever 4 which then moves the connecting rod 5 to cause the limit switches $Lu$, $Lu'$ to open, so that the main motor M will stop rotating.

Also, when the control switch $Cs$ is closed reversely, the connections R–A–$A_1$–U, S–B–$B_2$–$c_2$–$d_2$–W, T–C–$C_2$–$b_1$–$d_1$–V are obtained. Then the main motor M rotates in the reverse direction to cause the electrically-driven hoist 1 to wind the chain downwardly. At the limiting point of said winding operation the loop of the chain 3 contacts the limit lever 4 which moves the connecting rod 6 to cause the limit switches $Ld$, $Ld'$ to open, so that the main motor M will stop rotating.

In the following case, it is supposed that the given two lines S and T of the power source are carelessly interchanged; for example, connections R–A, S–C, T–B are obtained. Then, the phase-rotation detector $m$ detects the counterclockwise rotation of the phase and two movable contacts $d_1$, $d_2$ of the selective switch $Ss$ are changed over to engage the fixed contacts $c_1$, $b_2$, respectively, so that, if the control switch $Cs$ is closed in the normal direction, connections such as R–A–$A_1$–U, S–C–$C_1$–$c_1$–$d_1$–V, T–B–$B_1$–$b_1$–$b_2$–$d_2$–W will be obtained. As a result, the main motor M will rotate in the normal direction and the hook 2 will contact the limit lever 4 which moves the connecting rod 5 to cause the limit switches $Lu$, $Lu'$ to open, so that the main motor M will stop rotating.

Next, supposing that the control switch is closed reversely, then connections such as R–A–$A_1$–U, S–C–$C_2$–$b_1$–$b_2d_2$–W will be obtained. As a result, the main motor M rotates in the reverse direction. As a result, the loop of the chain 3 will contact the limit lever 4, which in turn moves the connecting rod 6 to cause the limit switches $Ld$, $Ld'$ to open, so that the motor M will stop rotating.

As described above, the present invention has a great advantage that the rotational direction of the main motor is in conformity with the closing direction of the control switch without being influenced by any connection between said switch and the power lines R, S and T, so that the limit switches can always function properly to prevent dangers due to over-winding and which may cause damage of the hoist body and/or the cutting of the chain, and accordingly the safe operation will be attained with increased efficiency.

From the above description it will be understood that many modifications of the specific disclosed form of the invention may be resorted to. For instance, the selective switch may be inserted between the power source S, T and the control switch B, C. And the control switch may be replaced by an electromagnetic switch, in the control circuit of which the limit switches are placed. Also a control switch that serves as well for the limit switches may be used.

Having thus described the invention, what is claimed as new and desired to be secured by Letters Patent, is:

I claim:

1. In combination with a three-phase motor connected to a three-phase source through a rotation direction control switch operable to selectively change the motor rotation direction by reversing the connections of one phase of said source to said motor: means for ensuring proper direction of rotation of said motor in accordance with pre-set operation of said reversing switch, said means comprising, in combination, reversing switch means connected in said one phase between said source and said motor and operable, when actuated, to interchange the connections of said one phase to said motor; and polyphase actuating means for said reversing switch means connected to said source and operable, responsive to a polarity reversal of said one phase, to actuate said reversing switch means to interchange the connections of said one phase to said motor through said control switch.

2. The combination claimed in claim 1 including limit switch means interposed between said control switch and said motor; and operating means effective to open said limit switch means to disconnect said motor from said source responsive to said motor reaching its limit of rotation in either direction.

3. The combination claimed in claim 1 including limit switch means interposed between said control switch and said reversing switch means; and operating means effective to open said limit switch means to disconnect said motor from said source responsive to said motor reaching its limit of rotation in either direction.

4. In combination with a three-phase motor connected to a three-phase source through a rotation direction control switch operable to selectively change the motor rotation direction by reversing the connections of one phase of said source to said motor: means for ensuring proper direction of rotation of said motor in accordance with pre-set operation of said reversing switch, said means comprising, in combination, reversing switch means connected in said one phase between said control switch and said motor and operable, when actuated, to interchange the connections of said one phase from said reversing switch to said motor; and polyphase actuating means for said reversing switch means connected to said source and operable, responsive to a polarity reversal of said one phase, to actuate said reversing switch means to interchange the connections of said one phase between said motor and said control switch.

5. The combination claimed in claim 4 in which said polyphase actuating means is a small polyphase motor in driving connection with said reversing switch means.

References Cited by the Examiner
UNITED STATES PATENTS

| | | | |
|---|---|---|---|
| 1,657,303 | 1/28 | Evans | 317—48 |
| 2,205,566 | 6/40 | Kollmer | 318—282 X |
| 2,724,782 | 11/55 | Holloway | 317—48 |
| 3,039,036 | 6/62 | Wendelburg | 318—282 X |

ORIS L. RADER, *Primary Examiner.*

JOHN F. COUCH, *Examiner.*